United States Patent
Sakamoto

(10) Patent No.: US 8,403,716 B2
(45) Date of Patent: Mar. 26, 2013

(54) TWIN-SKEG SHIP

(75) Inventor: Toshinobu Sakamoto, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 55 days.

(21) Appl. No.: 12/990,009

(22) PCT Filed: Oct. 20, 2008

(86) PCT No.: PCT/JP2008/068987
§ 371 (c)(1),
(2), (4) Date: Nov. 12, 2010

(87) PCT Pub. No.: WO2010/046961
PCT Pub. Date: Apr. 29, 2010

(65) Prior Publication Data
US 2011/0053441 A1 Mar. 3, 2011

(51) Int. Cl.
*B63H 1/18* (2006.01)
(52) U.S. Cl. .......................................................... 440/66
(58) Field of Classification Search .................. 440/66, 440/68, 69
See application file for complete search history.

(56) References Cited

U.S. PATENT DOCUMENTS

| | | | |
|---|---|---|---|
| 4,427,393 A | 1/1984 | May | |
| 4,631,036 A * | 12/1986 | Grothues-Spork | 440/66 |
| 5,209,642 A * | 5/1993 | Larimer et al. | 416/223 R |

FOREIGN PATENT DOCUMENTS

| | | |
|---|---|---|
| CN | 2081371 | 7/1991 |
| CN | 1058758 | 2/1992 |
| CN | 1120505 | 4/1996 |
| GB | 27287 | 0/1914 |
| JP | S48-44391 | 12/1973 |
| JP | 50-73 | 1/1975 |
| JP | S50-15349 | 5/1975 |
| JP | 59-180999 | 12/1984 |
| JP | 05-185986 | 7/1993 |
| JP | 07-267189 | 10/1995 |
| JP | 08-133172 | 5/1996 |
| JP | 2006-341640 | 12/2006 |
| JP | 2008-174115 | 7/2008 |

OTHER PUBLICATIONS

International Search Report issued Jan. 27, 2009 in International (PCT) Application No. PCT/JP2008/068987.
Supplementary European Search Report issued Mar. 20, 2012 in corresponding European Application No. 08 87 7527.
Japanese Notice of Allowance issued Oct. 1, 2012 in corresponding European Application No. 08 877 527.5.

(Continued)

*Primary Examiner* — Stephen Avila
(74) *Attorney, Agent, or Firm* — Wenderoth, Lind & Ponack, L.L.P.

(57) ABSTRACT

A twin-skeg ship that allows for an improvement in propulsion performance (propulsion efficiency). A twin-skeg ship has a pair of left and right skegs on the bottom of a stern has reaction fins, each comprising a plurality of fins extending radially from a bossing fixed to a stern frame provided at a rear end of the skeg, or from a fin boss provided on the bossing, in a range where a flow immediately in front of a propeller attached to the skeg with a propeller shaft therebetween has a component in the same direction as a rotational direction of the propeller.

2 Claims, 8 Drawing Sheets

OTHER PUBLICATIONS

Japanese Office Action issued Sep. 4, 2012 in corresponding Japanese Application No. 2010-534615.

Chinese Office Action issued Oct. 19, 2012 in corresponding Chinese Patent Application No. 200880128858.9.

* cited by examiner

HULL CENTERLINE

HULL CENTERLINE

HULL CENTERLINE

HULL CENTERLINE

HULL CENTERLINE

TWIN-SKEG SHIP

BACKGROUND OF THE INVENTION

I. Technical Field

The present invention relates to twin-skeg ships having a pair of left and right skegs provided on the bottom of the stern so as to support propeller shafts.

II. Description of the Related Art

A twin-skeg ship having a pair of left and right propeller shafts supported by skegs integrated with the hull so as to form a tunnel-like bottom recess between the left and right skegs is known in the related art (see, for example, Japanese Unexamined Patent Application, Publication No. HEI-8-133172).

On the other hand, a reaction fin has been devised as a propulsion-performance improving unit installed in a ship to improve the propulsion performance of the ship (unit for improving the speed of the ship with the same horsepower) (see, for example, Japanese Unexamined Patent Application, Publication No. HEI-5-185986).

SUMMARY OF THE INVENTION

A twin-skeg ship (particularly, a twin-skeg ship having a pair of left and right propellers that rotate inward as viewed from the stern) has the central axes of propeller shafts extending off the centerline of the hull, and the stern shape and the propeller shape can be modified so as to increase the rotating flow component in the opposite direction to the rotation of the propellers, thus providing the same effect as a reaction fin.

Accordingly, in the related art, a reaction fin has not been applied to a twin-skeg ship because the fin creates resistance underwater while improving the propulsion performance of the ship.

However, a further improvement in propulsion performance during sailing has been demanded for more energy-saving sailing.

An object of the present invention, which has been made in light of the above circumstances, is to provide a twin-skeg ship that allows for a further improvement in propulsion performance (propulsion efficiency).

To solve the above problem, the present invention employs the following solutions.

A first aspect of a twin-skeg ship according to the present invention is a twin-skeg ship having a pair of left and right skegs on the bottom of a stern, and the twin-skeg ship has reaction fins, each including a plurality of fins extending radially from a bossing fixed to a stern frame provided at a rear end of the skeg, or from a fin boss provided on the bossing, in a range where a flow immediately in front of a propeller attached to the skeg with a propeller shaft therebetween has a component in the same direction as a rotational direction of the propeller.

A second aspect of a twin-skeg ship according to the present invention is a twin-skeg ship having a pair of left and right skegs on the bottom of a stern, and the twin-skeg ship has reaction fins, each including a plurality of fins extending radially from a bossing fixed to a stern frame provided at a rear end of the skeg, or from a fin boss provided on the bossing, in a range where a flow direction angle immediately in front of a propeller attached to the skeg with a propeller shaft therebetween is $-10°$ or more.

More preferably, in the above twin-skeg ships, the reaction fins are each provided in a range where a value calculated by dividing a flow velocity immediately in front of the propeller attached to the skeg with the propeller shaft therebetween by the speed of the ship is 0.7 or less.

A third aspect of a twin-skeg ship according to the present invention is a twin-skeg ship having a pair of left and right skegs on the bottom of a stern, and the twin-skeg ship has reaction fins, each including a plurality of fins extending radially from a bossing fixed to a stern frame provided at a rear end of the skeg, or from a fin boss provided on the bossing, in a range where a value calculated by dividing a flow velocity immediately in front of a propeller attached to the skeg with a propeller shaft therebetween by the speed of the ship is 0.7 or less.

A fourth aspect of a twin-skeg ship according to the present invention is a twin-skeg ship having a pair of left and right skegs on the bottom of a stern, and fins are installed only on outer sides of the port and starboard skegs.

In the twin-skeg ships according to the present invention, the reaction fins in front of the propellers are installed only at sites where the fins are effective so that flows in the directions opposite to the rotational directions of the propellers can be effectively created at those sites, thus increasing the wake gain and therefore improving the propulsion performance (propulsion efficiency).

The present invention has the advantage of further improving the propulsion performance (propulsion efficiency).

DETAILED DESCRIPTION OF THE INVENTION

A first embodiment of a twin-skeg ship according to the present invention will be described below on the basis of FIGS. 1 to 9.

Figure 1:
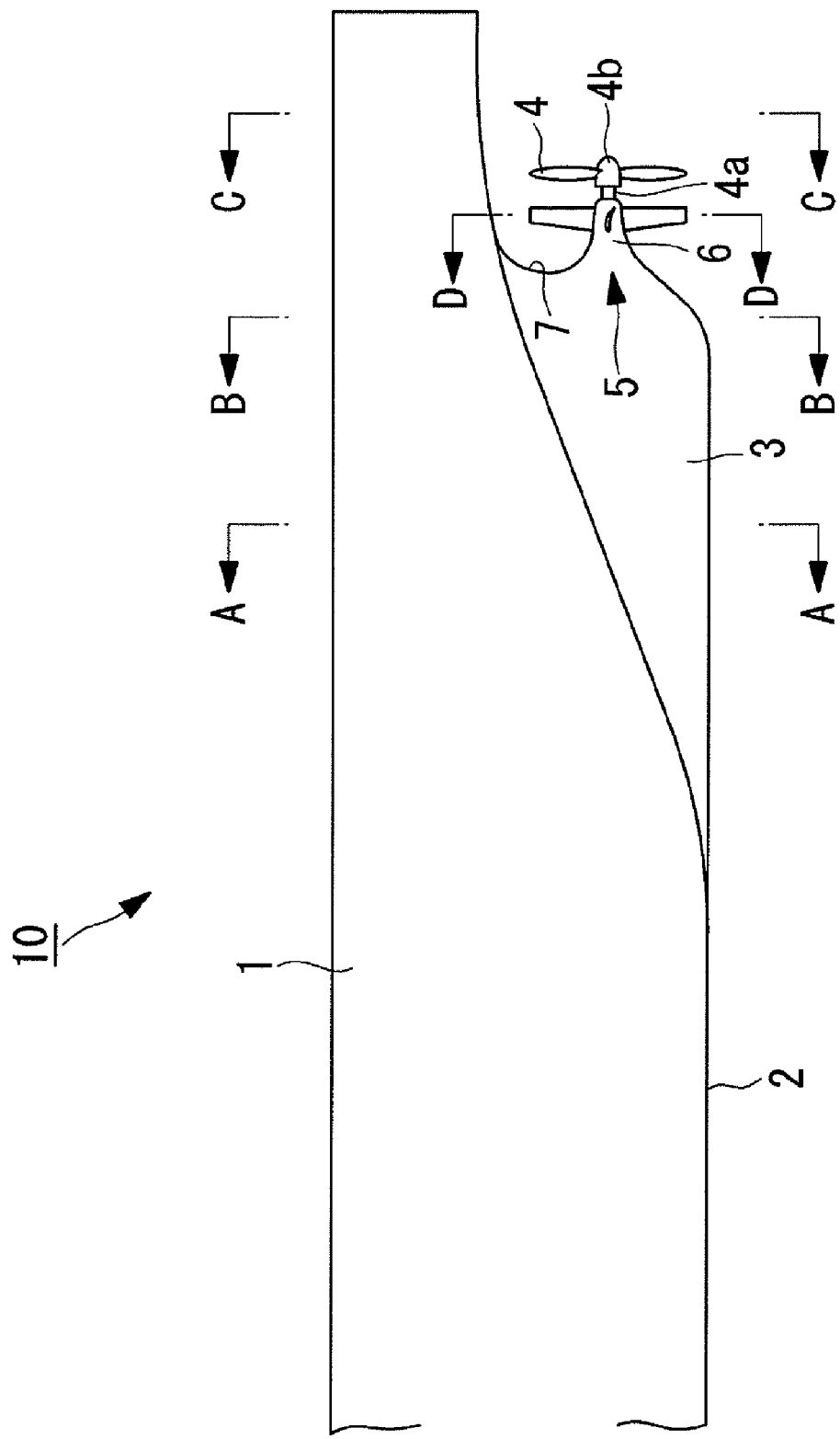
FIG. 1 is a left side view of the stern of a twin-skeg ship according to a first embodiment of the present invention as viewed from the port side.

FIG. 1 is a left side view of the stern of a twin-skeg ship 10 according to this embodiment as viewed from the port side, and, in FIG. 1, reference 1 is a hull, reference 2 is a bottom, reference 3 is a skeg, reference 4 is a propeller (screw), reference 4a is a propeller shaft, and reference 5 is a reaction fin. For simplicity of the drawings, a rudder is not shown in FIG. 1.

Figure 2:
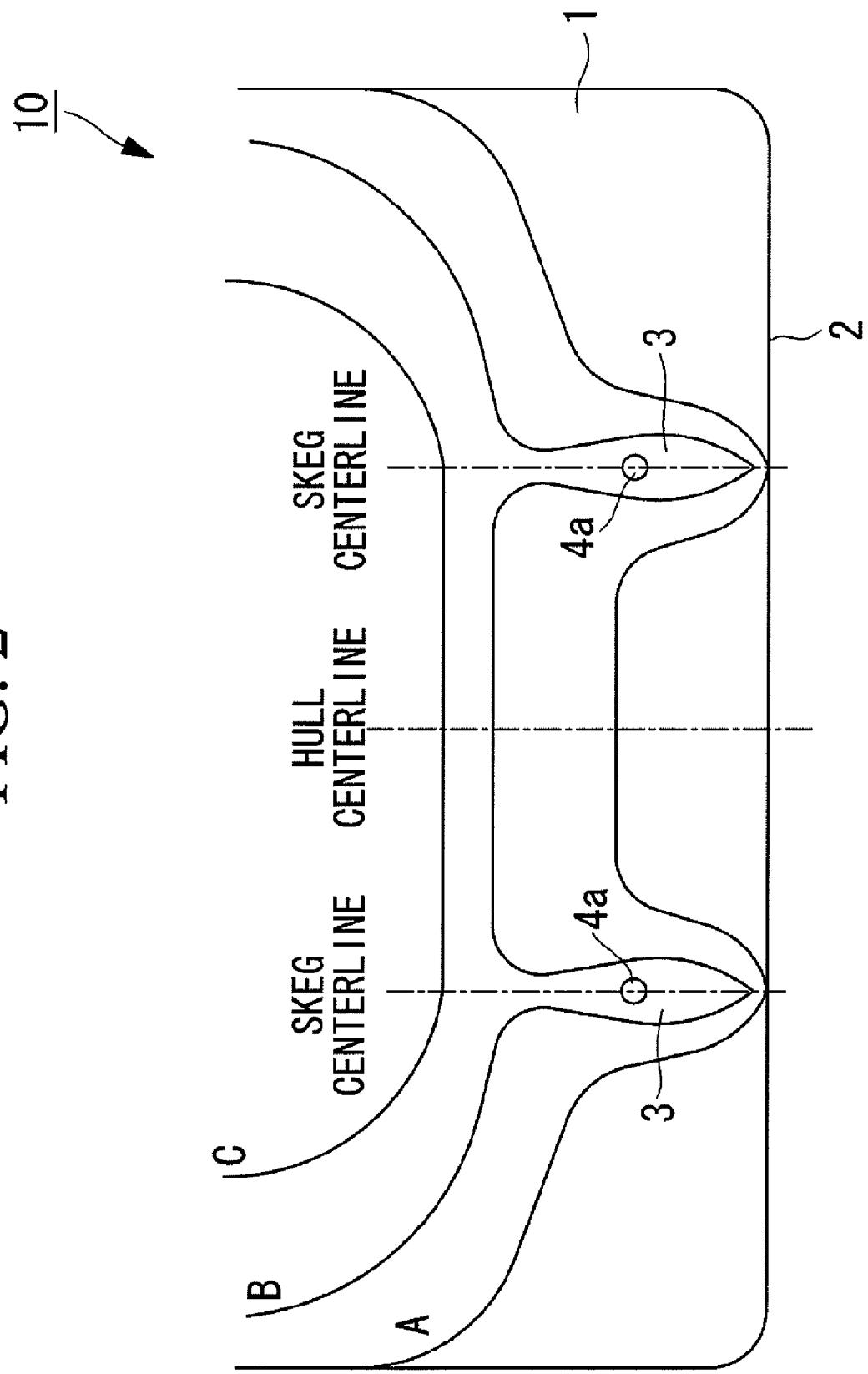
FIG. 2 is a diagram of a hull shown in FIG. 1, showing cross sections taken in the breadth direction along arrows A-A, B-B, and C-C.

FIG. 2 is a diagram of the hull 1 shown in FIG. 1, showing cross sections taken in the breadth direction along arrows A-A, B-B, and C-C, where the cross sections corresponding to arrows A-A, B-B, and C-C are denoted by references A, B, and C, respectively. As shown in FIG. 2, the twin-skeg ship 10 includes a pair of left and right skegs 3 provided so as to protrude downward from the bottom 2 in the stern of the hull 1. In addition, the pair of left and right skegs 3 each have an independent propeller 4 (see FIG. 1) attached to the rear end thereof.

Reference 4a in FIG. 2 is a propeller shaft.

Figure 3:
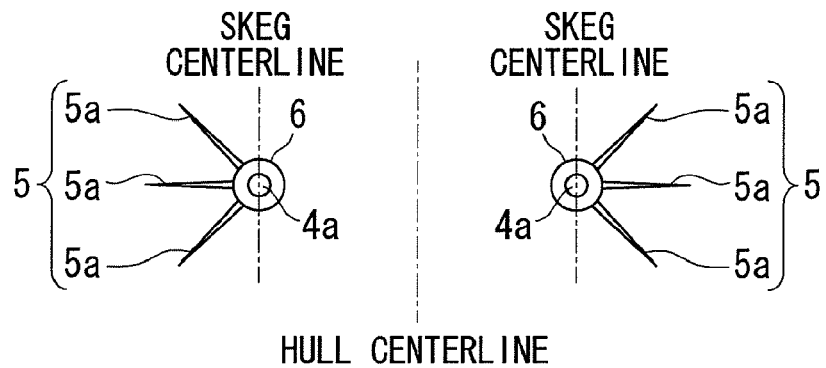
FIG. 3 is a sectional view of the hull shown in FIG. 1 taken in the breadth direction along arrow D-D.

FIG. 3 is a sectional view of the hull 1 shown in FIG. 1 taken in the breadth direction along arrow D-D. As shown in FIG. 3, the reaction fins 5 are composed of a plurality of fins 5a (in this embodiment, three on the port side and three on the starboard side, that is, six in total) protruding radially from bossings 6 (or from fin bosses (not shown) provided on the bossings 6) so that rotating flows in the directions opposite to the rotational directions of the propellers 4, located behind, are applied to flows entering the propellers 4.

The bossings 6 are fixed to stern frames 7 provided at the rear ends of the skegs 3, with the propeller shafts 4a extending therethrough in a rotatable manner.

Figure 4:
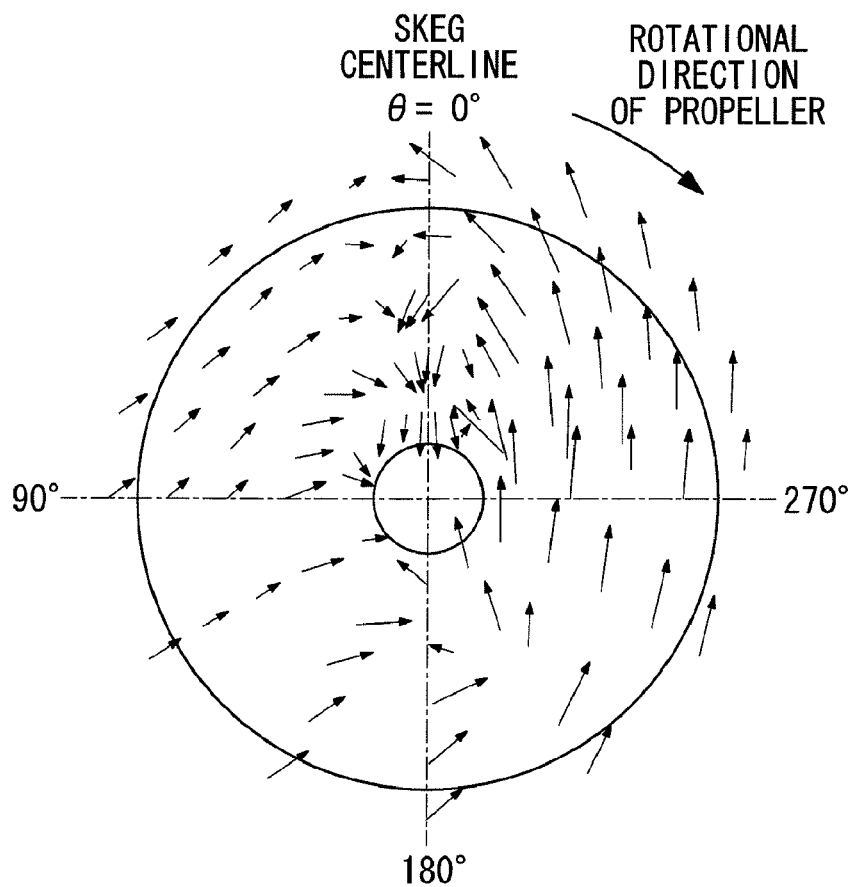
FIG. 4 is a diagram showing the results of a detailed analysis of a flow field immediately in front of a propeller attached to a port skeg with a propeller shaft therebetween for a certain twin-skeg ship having a pair of left and right propellers that rotate inward as viewed from the stern.
Figure 5:
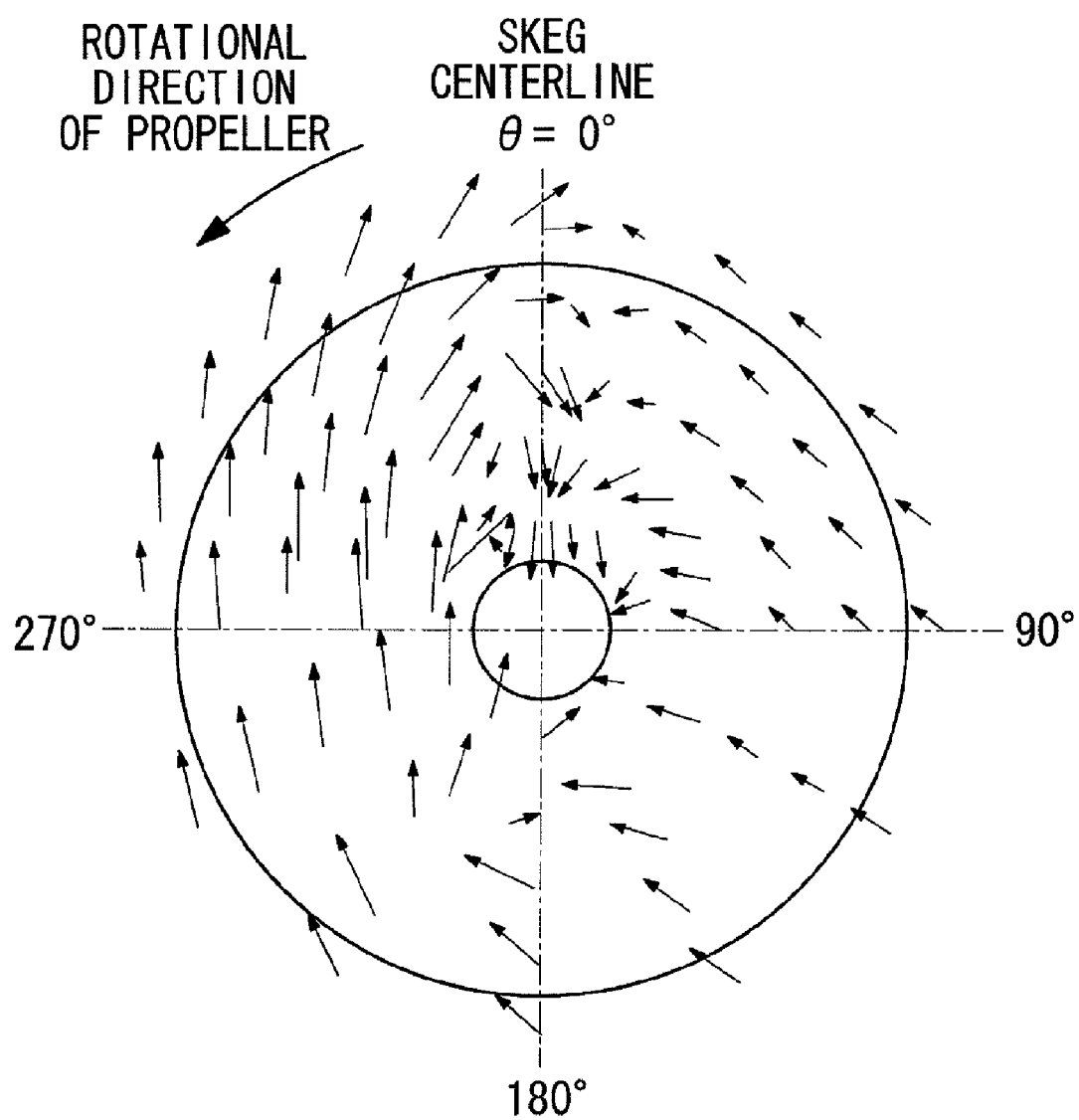
FIG. 5 is a diagram showing the results of a detailed analysis of a flow field immediately in front of a propeller attached to a starboard skeg with a propeller shaft therebetween for a certain twin-skeg ship having a pair of left and right propellers that rotate inward as viewed from the stern.

FIG. 4 is a diagram showing the results of a detailed analysis of a flow field immediately in front of a propeller 4 attached to a port skeg 3 with a propeller shaft 4a therebetween for a certain twin-skeg ship (equipped with no reaction fin 5) having a pair of left and right propellers 4 that rotate inward as viewed from the stern. FIG. 5, on the other hand, is a diagram showing the results of a detailed analysis of a flow field immediately in front of a propeller 4 attached to a starboard skeg 3 with a propeller shaft 4a therebetween for a certain twin-skeg ship (equipped with no reaction fin 5) having a pair of left and right propellers 4 that rotate inward as viewed from the stern.

In FIGS. 4 and 5, the directions of the arrows indicate the directions of flows in a plane, the lengths of the arrows indicate the magnitudes of the flows, the circles located at the inner side in the radial direction indicate the propeller bosses 4b (see FIG. 1), and the circles located at the outer side in the radial direction indicate the turning radii of the propellers 4.

As shown in FIGS. 4 and 5, upward flows in the directions opposite to the rotational directions of the propellers 4 are stronger between the skeg centerlines, namely, in the range of θ=180° to 360° (0°), whereas upward flows in the same directions as the rotational directions of the propellers 4 are stronger outside the skeg centerlines in the breadth direction, namely, in the range of θ=0° to 180°.

A reaction fin is a unit for improving the propulsion efficiency by changing the direction of a flow in front of a propeller to the direction opposite to the rotational direction of the propeller; the effect of the fin is decreased at a site where a flow in the direction opposite to the rotational direction of the propeller originates.

Accordingly, as shown in FIG. 3, the reaction fins 5 installed in the twin-skeg ship 10 according to this embodiment are provided in the range of θ=0° to 180°, where there is no flow in the directions opposite to the rotational directions of the propellers 4, so as to protrude radially outward of the skeg centerlines in the breadth direction.

That is, the twin-skeg ship 10 according to this embodiment has the fins thereof installed only on the outer sides of the port and starboard skegs.

An end (root) of each fin 5a is fixed to the bossing 6 (or fin boss), and the other end (leading end) of the fin 5a extends to substantially the turning radius of the propeller 4 (see FIGS. 4 and 5), although in some cases it is more effective to make the fin length shorter, depending on the flow conditions immediately in front of the propeller.

On the other hand, flows in the directions opposite to the rotational directions of the propellers 4 occur between the skeg centerlines, although no reaction fin 5 needs to be provided between the skeg centerlines, namely, in the range of θ=180° to 360°, because these flows are canceled out by rotating flows caused by the vanes of the propellers 4. In this embodiment, therefore, as shown in FIG. 3, the fins 5a extend in the directions θ=45°, 90°, and 135°.

In addition, the flow direction can be changed (controlled) to a desired direction by attaching the fins 5a at an appropriate angle of attack (for example, 15°) with respect to the flow direction angles, described later.

In the twin-skeg ship 10 according to this embodiment, the reaction fins 5 weaken (inhibit) upward flows occurring outside the skeg centerlines in the breadth direction, that is, flows in the same directions as the rotational directions of the propellers 4, and also induce flows in the directions opposite to the rotational directions of the propellers 4, thus improving the propulsion efficiency.

Thus, flows in the directions opposite to the rotational directions of the propellers can be created behind the propellers 4, thus increasing the wake gain and therefore improving the propulsion performance (propulsion efficiency).

Figure 6:
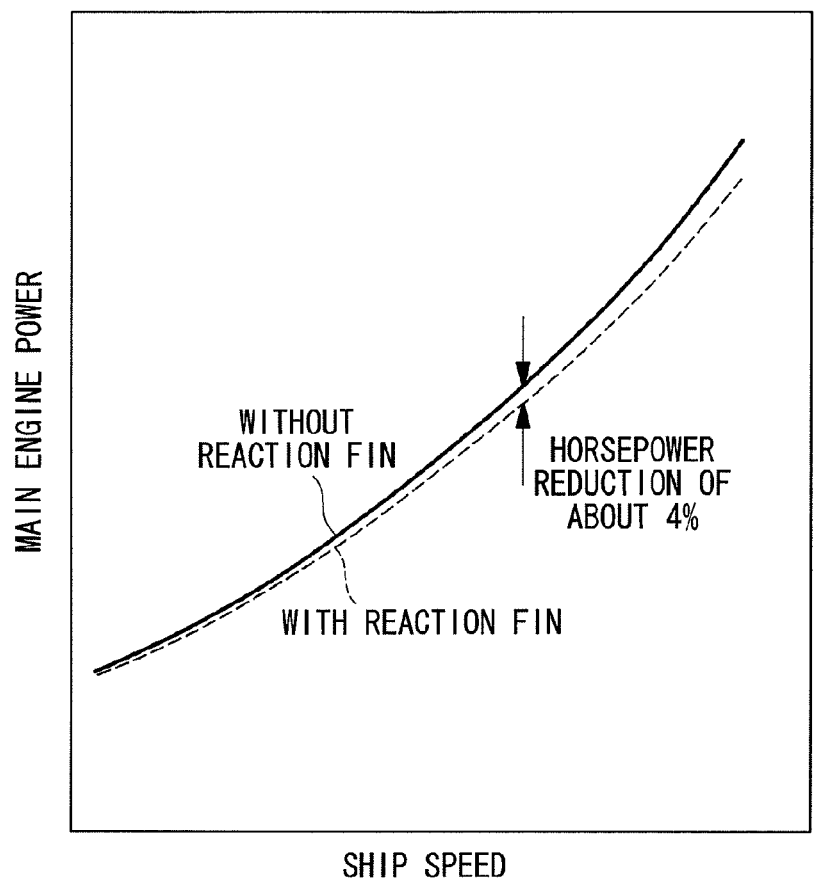
FIG. 6 is a graph showing experimental results obtained by sailing the twin-skeg ship according to the first embodiment of the present invention.

FIG. 6 is a graph showing experimental results obtained by sailing the twin-skeg ship 10 according to this embodiment, where the horizontal axis indicates ship speed (kn: knots) and the vertical axis indicates main engine power (kW). In addition, the solid line drawn from the lower left to the upper right in the graph shows data obtained from a twin-skeg ship equipped with no reaction fin 5, and the broken line drawn from the lower left to the upper right in the graph shows data obtained from the twin-skeg ship 10 according to this embodiment.

As shown in FIG. 6, the twin-skeg ship 10 according to this embodiment requires a lower horsepower than the twin-skeg ship equipped with no reaction fin 5 to achieve the same ship speed, and achieves a higher (increased) ship speed than the twin-skeg ship equipped with no reaction fin 5 when supplied with the same horsepower. As a result, a fuel cost reduction of about 4% is achieved as compared with the related art, which is an effective experimental result supporting the advantageous effect of the reaction fins 5.

A twin-skeg ship according to a second embodiment of the present invention will now be described with reference to FIGS. 7 to 10.

Figure 7:
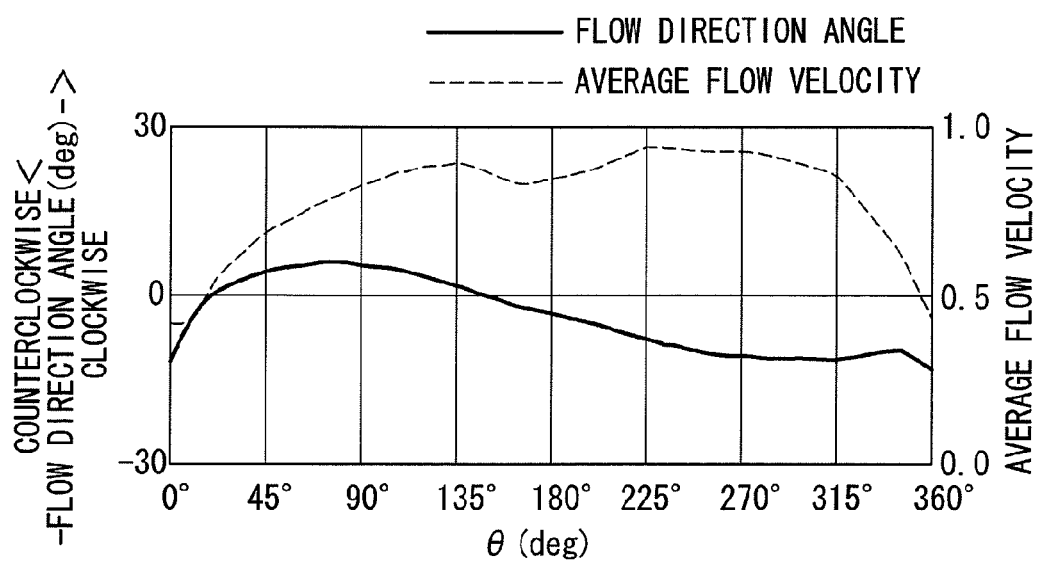
FIG. 7 is a graph showing the results of the calculation of a flow angle (flow direction angle) and average flow velocity immediately in front of a propeller attached to a port skeg with a propeller shaft therebetween for a certain twin-skeg ship having a pair of left and right propellers that rotate inward as viewed from the stern.

FIG. 7 is a graph showing the results of calculation of flow angle (flow direction angle) and average flow velocity immediately in front of a propeller 4 attached to a port skeg 3 with a propeller shaft 4a therebetween for a certain twin-skeg ship (equipped with no reaction fin 5) having a pair of left and right propellers 4 that rotate inward as viewed from the stern. The average flow velocity shown in FIG. 7 is made dimensionless by dividing the flow velocity immediately in front of the propeller 4 by the speed of the twin-skeg ship.

The twin-skeg ship according to this embodiment differs from that of the first embodiment described above in that a plurality of fins 5a (for example, four on the port side and four on the starboard side, that is, eight in total) are provided in the range where the flow direction angle is −10° or more, namely, θ=0° to 240° (for example, so as to extend in the directions θ=45°, 90°, 135°, and 225°). The other elements are the same as those of the first embodiment described above, and accordingly a description of those elements will be omitted here.

Here, the definition of the "flow direction angle" shown in FIG. 7 will be described on the basis of FIGS. 8 to 10.

Figure 8:
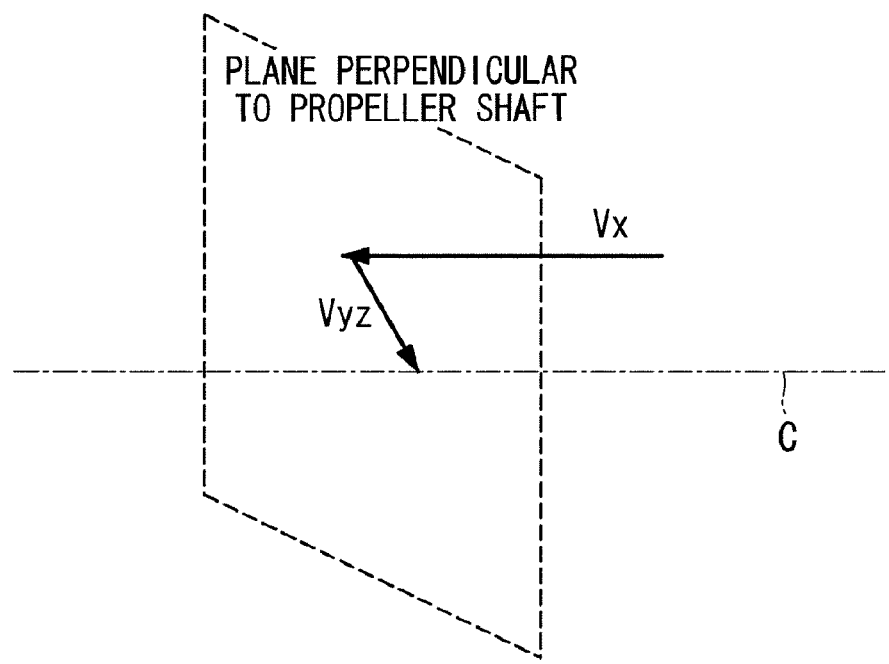
FIG. 8 is a diagram illustrating the definition of the "flow direction angle" shown in FIG. 7.

As shown in FIG. 8, the flow velocity at a certain point immediately in front of the propeller 4 is resolved into a component Vx parallel to the central axis C of the propeller shaft 4a and a component Vyz in a plane perpendicular to the propeller shaft 4a.

Figure 9:
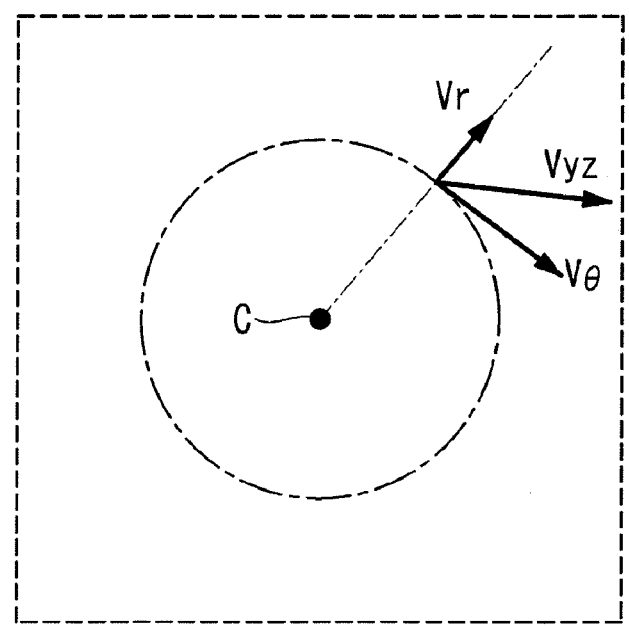
FIG. 9 is a diagram illustrating the definition of the "flow direction angle" shown in FIG. 7.

In addition, as shown in FIG. 9, the component Vyz in the plane perpendicular to the propeller shaft 4a is further resolved into a radial component Vr extending radially from the central axis C of the propeller shaft 4a and a circumferential component Vθ perpendicular thereto.

Figure 10:
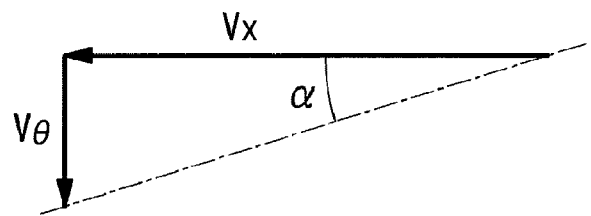
FIG. 10 is a diagram illustrating the definition of the "flow direction angle" shown in FIG. 7.

Accordingly, α shown in FIG. 10, that is, $\tan^{-1}(V\theta/Vx)$, is defined here as the "flow direction angle". As for positive and negative signs, the direction of propeller rotation is defined as being positive; that is, a flow in the range where the flow direction angle is positive is in the same direction as the propeller rotation, and a flow in the range where the flow direction angle is negative is in the opposite direction to the propeller rotation.

The flow direction angles and the average flow velocities in FIG. 7 are calculated by averaging flow direction angles and flow velocities at points of constant θ between the propeller boss and the propeller radius position in the radial direction.

Hence, if the angles at which the fins 5a are attached are equal to the flow direction angles at the points where the fins 5a are attached, the fins 5a have no angle of attack with respect to the flow. In addition, the flow direction can be changed (controlled) to a desired direction by attaching the fins 5a at an appropriate angle of attack (for example, 15°) with respect to the flow direction angles.

In the twin-skeg ship according to this embodiment, the reaction fins 5 weaken (inhibit) upward flows occurring outside the skeg centerlines in the breadth direction, that is, flows in the same directions as the rotational directions of the propellers 4, thus weakening (alleviating) a disturbance in the water behind the propellers 4.

Thus, flows in the directions opposite to the rotational directions of the propellers can be created behind the propellers 4, thus increasing the wake gain and therefore improving the propulsion performance (propulsion efficiency).

In addition, whereas a plurality of fins 5a are provided in the range where the flow direction angle is −10° or more, namely, θ=0° to 240°, in this embodiment, it is more preferable to add the condition that a plurality of fins 5a are provided in the range where the average flow velocity is 0.7 or less, namely, θ=0° to 50° and 335° to 360°, because fins installed at high average flow velocities create significantly increased resistance and therefore have a decreased propulsion-efficiency improving effect.

By adding the condition that a plurality of fins 5a are provided in the range where the average flow velocity is 0.7 or less, namely, θ=0° to 50° and 335° to 360°, the number of fins 5a that can be installed is inevitably decreased, and accordingly the resistance of the fins 5a can be reduced, thus further improving the propulsion performance (propulsion efficiency).

Whereas a plurality of fins 5a are provided in the range where the flow direction angle is −10° or more, namely, θ=0° to 240°, in the second embodiment described above, the present invention is not limited thereto; instead, a plurality of fins 5a (for example, one on the port side and one on the starboard side, that is, two in total) may be provided in the range where the average flow velocity is 0.7 or less, namely, θ=0° to 50° and 335° to 360° (for example, so as to extend in the direction θ=45°).

In addition, the lengths of the fins 5a do not necessarily have to be equal, as shown in FIG. 3, but may vary as needed.

Figure 11:
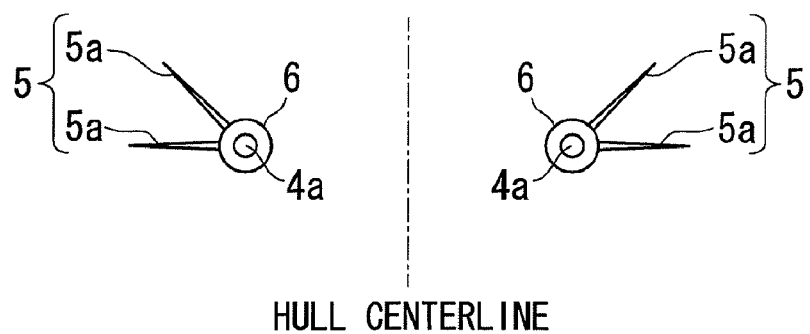
FIG. 11 is a diagram similar to FIG. 3, showing an example of reaction fins that can be applied to a twin-skeg ship according to the present invention.
Figure 12:
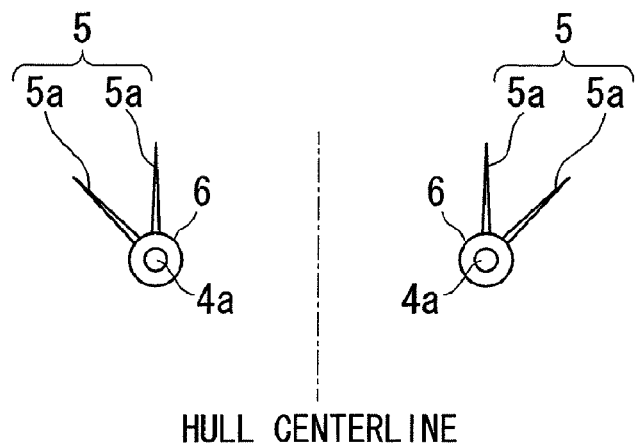
FIG. 12 is a diagram similar to FIG. 3, showing an example of reaction fins that can be applied to a twin-skeg ship according to the present invention.
Figure 13:
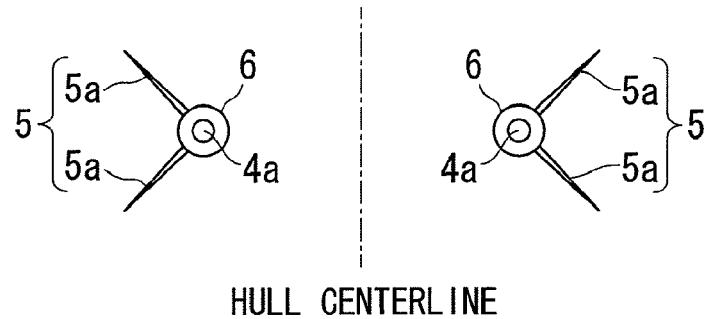
FIG. 13 is a diagram similar to FIG. 3, showing an example of reaction fins that can be applied to a twin-skeg ship according to the present invention.
Figure 14:
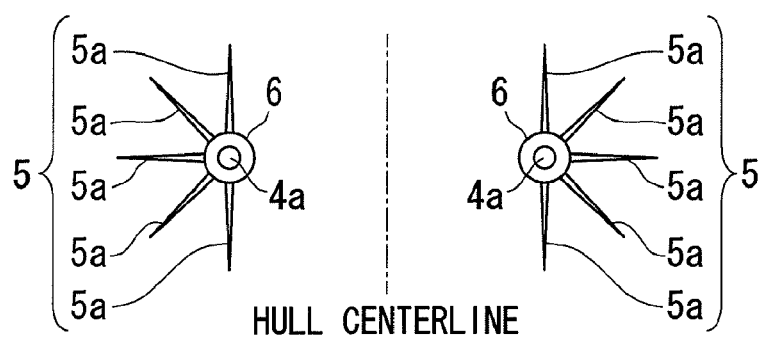
FIG. 14 is a diagram similar to FIG. 3, showing an example of reaction fins that can be applied to a twin-skeg ship according to the present invention.
Figure 15:
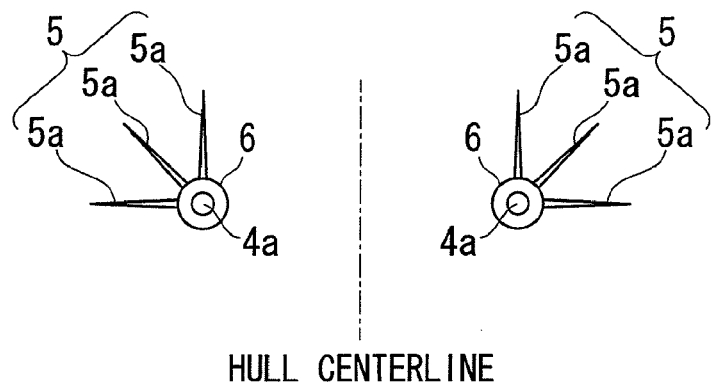
FIG. 15 is a diagram similar to FIG. 3, showing an example of reaction fins that can be applied to a twin-skeg ship according to the present invention.

Moreover, the fins 5a described in the first embodiment do not necessarily have to extend in the directions θ=45°, 90°, and 135°, as shown in FIG. 3, but may extend, for example, in the directions θ=45° and 90°, as shown in FIG. 11, in the directions θ=0° and 45°, as shown in FIG. 12, in the directions θ=45° and 135°, as shown in FIG. 13, in the directions θ=0°, 45°, 90°, 135°, and 180°, as shown in FIG. 14, or in the directions θ=0°, 45°, and 90°, as shown in FIG. 15.

Furthermore, the present invention can be applied not only to a twin-skeg ship having a pair of left and right propellers 4 that rotate inward as viewed from the stern, but also to a twin-skeg ship having a pair of left and right propellers 4 that rotate outward as viewed from the stern.

The invention claimed is:

1. A twin-skeg ship comprising:
   a stern having a bottom;
   left and right skegs on the bottom of the stern;
   left and right stern frames disposed at a rear end of the left and right skegs, respectively; and
   reaction fins, each reaction fin of the reaction fins comprising a plurality of fins extending radially from a bossing fixed to the stern frame disposed at the rear end of a respective skeg of the left and right skegs, or each reaction fin of the reaction fins comprising a plurality of fins extending radially from a fin boss provided on the bossing,
   wherein the reaction fins are arranged in a range to enable a flow immediately in front of a propeller attached to the respective skeg with a propeller shaft therebetween to have a component in the same direction as a rotational direction of the propeller,
   wherein each reaction fin of the reaction fins is arranged in a range so as to enable a value calculated by dividing a flow velocity immediately in front of the propeller attached to the respective skeg with the propeller shaft therebetween by the speed of the ship to be 0.7 or less, and
   wherein the plurality of fins are disposed only on outer sides of the left and right skegs.

2. The twin-skeg ship according to claim 1,
   wherein the reaction fins are arranged in a range to enable a flow direction angle immediately in front of a propeller attached to the respective skeg with a propeller shaft therebetween to be −10° or more.

* * * * *